(12) United States Patent
Foster et al.

(10) Patent No.: US 7,150,782 B2
(45) Date of Patent: Dec. 19, 2006

(54) MAGENTA METAL COMPLEX AZO COMPOUNDS AND INKS AND THEIR USE IN INK-JET PRINTING

(75) Inventors: Clive Edwin Foster, Manchester (GB); John Mayall, Manchester (GB); Mark Kenworthy, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

(21) Appl. No.: 10/559,470

(22) PCT Filed: May 20, 2004

(86) PCT No.: PCT/GB2004/002189

§ 371 (c)(1),
(2), (4) Date: Dec. 5, 2005

(87) PCT Pub. No.: WO2004/108834

PCT Pub. Date: Dec. 16, 2004

(65) Prior Publication Data

US 2006/0137571 A1 Jun. 29, 2006

(30) Foreign Application Priority Data

Jun. 6, 2003 (GB) .................................. 0313013.5

(51) Int. Cl.
*C09D 11/00* (2006.01)
*C09B 45/00* (2006.01)
(52) U.S. Cl. ............................. 106/31.46; 106/31.48; 106/31.5; 534/653; 534/690; 534/707
(58) Field of Classification Search ............ 106/31.46, 106/31.48, 31.5; 534/653, 690; 535/707; 347/100; 428/195.1
See application file for complete search history.

(56) References Cited

U.S. PATENT DOCUMENTS

| | | | | |
|---|---|---|---|---|
| 2,741,655 | A * | 4/1956 | Henri et al. ................. | 534/690 |
| 3,423,392 | A * | 1/1969 | Wolfrum et al. ............ | 534/653 |
| 4,824,485 | A * | 4/1989 | Tanaka et al. ............. | 106/31.48 |
| 5,330,542 | A * | 7/1994 | Maeda et al. ................. | 8/639 |
| 5,980,622 | A * | 11/1999 | Byers ....................... | 106/31.48 |
| 6,001,161 | A * | 12/1999 | Evans et al. ............. | 106/31.48 |
| 6,551,682 | B1 * | 4/2003 | Tosaki et al. .............. | 428/64.1 |
| 6,755,903 | B1 * | 6/2004 | Yamada et al. ............ | 106/31.45 |
| 6,827,770 | B1 * | 12/2004 | Chino et al. ............. | 106/31.46 |
| 6,969,421 | B1 * | 11/2005 | Wright et al. .............. | 106/31.5 |
| 6,979,364 | B1 * | 12/2005 | Wright et al. .............. | 106/31.5 |
| 7,025,815 | B1 * | 4/2006 | Shimizu et al. .......... | 106/31.46 |
| 2005/0103225 | A1 * | 5/2005 | Shimizu et al. .......... | 106/31.27 |
| 2005/0109237 | A1 * | 5/2005 | Shimizu .................. | 106/31.46 |

FOREIGN PATENT DOCUMENTS

| EP | A-0902064 | 3/1999 |
|---|---|---|
| EP | A-0971003 | 1/2000 |
| EP | 0995612 | * 4/2000 |
| EP | A-1270676 | 1/2003 |
| JP | 2001220519 | 8/2001 |

* cited by examiner

*Primary Examiner*—Helene Klemanski
(74) *Attorney, Agent, or Firm*—Morgan Lewis & Bockius LLP

(57) ABSTRACT

A metal chelate compound obtainable from contacting a transition metal salt with a compound of the Formula (1):

Formula (1)

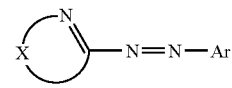

wherein:
x represents plural atoms required to form at least one optionally substituted 5- to 7-membered heterocyclic ring; and
Ar is an optionally substituted stilbene, acenaphthylene, phenanthrene or anthracene group carrying a hydroxy, amino or carboxy group adjacent to the —N=N— group shown in Formula (1) or 6-hydroxyquinoline where the hydroxy group is adjacent to the —N=N— group shown in Formula (1);
provided that when the compound of Formula (1) is of Formula:

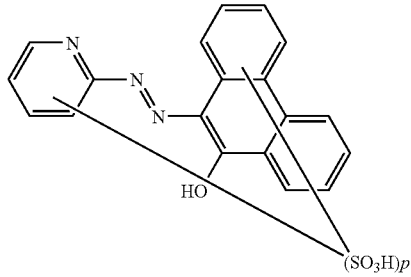

that, p, the level of sulfonation, is not in the range 1 to 2. Also compositions, inks, printed substrates and inkjet cartridges.

18 Claims, No Drawings

MAGENTA METAL COMPLEX AZO COMPOUNDS AND INKS AND THEIR USE IN INK-JET PRINTING

This invention relates to compounds, to inks and to their use in ink-jet printing ("IJP"). IJP is a non-impact printing technique in which droplets of ink are ejected through a fine nozzle onto a substrate without bringing the nozzle into contact with the substrate.

There are many demanding performance requirements for compounds and inks used in IJP. For example they desirably provide sharp, non-feathered images having good water-fastness, light-fastness and optical density. The inks are often required to dry quickly when applied to a substrate to prevent smudging, but they should not form a crust over the tip of an ink-jet nozzle because this will stop the printer from working. The inks should also be stable to storage over time without decomposing or forming a precipitate which could block the fine nozzle.

WO 01/48090 relates to metal chelate azo compounds which comprise a naphthol component and heterocyclic groups.

There is a need for compounds which meet the demanding performance requirements in IJP and, in particular, having a good combination of high chroma (i.e. brightness), high light-fastness and fastness to oxidising gases (e.g. ozone).

According to a first aspect of the present invention there is provided a metal chelate compound obtainable from contacting a transition metal salt with a compound of the Formula (1) or a salt thereof:

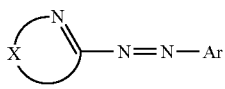

Formula (1)

wherein:
X represents plural atoms required to form at least one optionally substituted 5- to 7-membered heterocyclic ring; and
Ar is an optionally substituted stilbene, acenaphthylene, phenanthrene or anthracene group carrying a hydroxy, amino or carboxy group adjacent to the —N=N— group shown in Formula (1) or 6-hydroxyquinoline where the hydroxy group is adjacent to the —N=N— group shown in Formula (1);
provided that when the compound of Formula (1) is of Formula:

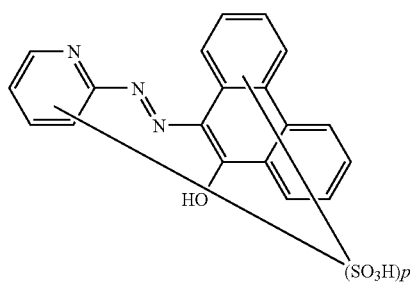

that, p, the level of sulfonation, is not in the range 1 to 2.

The optionally substituted stilbene group is preferably of the Formula (2a) or Formula (2b):

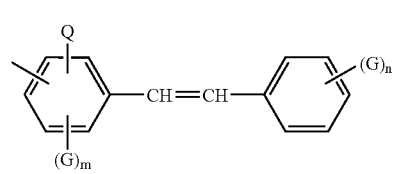

Formula (2a)

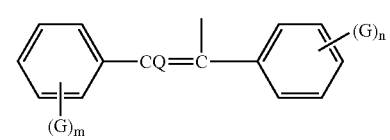

Formula (2b)

wherein
Q is a hydroxy, amino or carboxy group positioned adjacent to the —N=N— group shown in Formula (1);
G is a water-solubilising group; and
m and n are each independently 0, 1 or 2.

Preferably Q is a hydroxy group.

Preferably the value of (m+n) is greater than 1, more preferably 1 to 4 and especially 1 to 2.

The values of m and n may represent either an integer, from when the compound in made from a starting material already bearing the water-solubilising group, or an average, from when the water-solubilising group is introduced after synthesis of the compound of Formula (2a) or (2b) e.g. via sulfonation.

Preferably each G independently is selected from sulfo, phosphate and carboxy, more preferably all groups represented by G are sulfo.

The optionally substituted 6-hydroxyquinoline group is preferably of Formula (3):

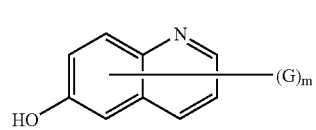

Formula (3)

wherein:
the hydroxy group is positioned adjacent to the —N=N— group shown in Formula (1);
G is a water-solubilising group; and
m is 0 to 4, preferably 0 to 2.

The value of m may represent either an integer, from when the compound in made from a starting material already bearing the water-solubilising group, or it may represent an average, from when the water-solubilising group is introduced after synthesis of the compound of Formula (3) e.g. via sulfonation.

Preferably each G independently is selected from sulfo, phosphate and carboxy, more preferably all groups represented by G are sulfo.

The optionally substituted phenanthrene group is preferably of Formula (4) and more preferably of Formula (4a):

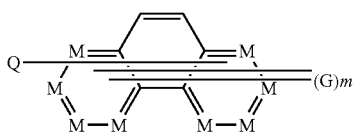

Formula (4)

wherein
M is C or N;
Q is a hydroxy, amino or carboxy group positioned adjacent to the —N=N— group shown in Formula (1);
G is a water-solubilising group; and
m is greater than 0, preferably 1 to 4 and more preferably 2 to 3.

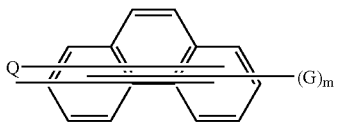

Formula (4a)

wherein
Q is a hydroxy, amino or carboxy group positioned adjacent to the —N=N— group shown in Formula (1);
G is a water-solubilising group; and
m is greater than 0, preferably 1 to 4 and more preferably 2 to 3 provided that when the compound of Formula (1) is of Formula:

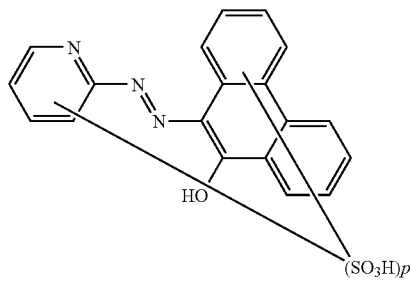

that, p, the level of sulfonation, is not in the range 1 to 2.

The value of m may represent either an integer, from when the compound in made from a starting material already bearing the water-solubilising group, or it may represent an average, from when the water-solubilising group is introduced after synthesis of the compound of Formula (4) e.g. via sulfonation.

Preferably each G independently is selected from sulfo, phosphate and carboxy, more preferably all groups represented by G are sulfo.

The preferred anthracene group is of Formula (5)

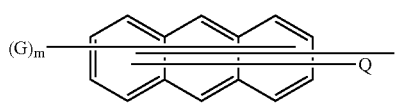

Formula (5)

wherein
Q is a hydroxy, amino or carboxy group positioned adjacent to the —N=N— group shown in Formula (1);
G is a water-solubilising group; and
m is greater than 1, preferably 1 to 4 more preferably 2 to 3.

The value of m may represent either an integer, from when the compound in made from a starting material already bearing the water-solubilising group, or it may represent an average, from when the water-solubilising group is introduced after synthesis of the compound of Formula (5) e.g. via sulfonation.

Preferably each G independently is selected from sulfo, phosphate and carboxy, more preferably all groups represented by G are sulfo.

The preferred optionally substituted acenaphthylene group is of Formula (6):

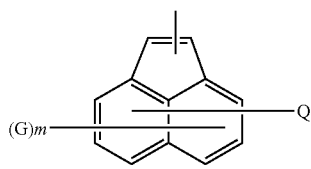

Formula (6)

wherein
Q is a hydroxy, amino or carboxy group positioned adjacent to the —N=N— group shown in Formula (1);
G is a water-solubilising group; and
m is 0 to 4, more preferably 0 to 2 and especially 1 to 2.

The value of m may represent either an integer, from when the compound in made from a starting material already bearing the water-solubilising group, or it may represent an average, from when the water-solubilising group is introduced after synthesis of the compound of Formula (3) e.g. via sulfonation.

Preferably each G independently is selected from sulfo, phosphate and carboxy, more preferably all groups represented by G are sulfo.

The heterocyclic ring containing X may have substituent(s) on the heterocyclic ring or the substituent(s) on the heterocyclic ring may form a condensed ring through further condensation, and the condensed ring so formed may also carry substituent(s).

The heterocyclic ring containing X is preferably an optionally substituted imidazole ring, an optionally substituted pyridine ring, an optionally substituted pyrazole ring, an optionally substituted triazole ring, an optionally substituted isoxazole ring, an optionally substituted thiazole ring, an optionally substituted thiadiazole ring, an optionally substituted pyridazine ring, an optionally substituted pyrimidine ring, an optionally substituted pyrazine ring, an optionally substituted benzothiazole ring, an optionally substituted benzoxazole ring or an optionally substituted benzimidazole ring.

It is preferred that the heterocyclic ring containing X is an optionally substituted imidazole ring, an optionally substituted pyrazole ring, an optionally substituted thiazole ring, an optionally substituted thiadiazole ring or, more preferably, an optionally substituted thiadiazole ring, an optionally substituted triazole ring, an optionally substituted pyridine ring or an optionally substituted oxadiazole ring, especially a pyridine ring or a triazole ring.

When the heterocyclic ring containing X (which may form one or more condensed rings) has one or more substituents, the substituents are preferably each independently selected from: alkyl group which may be substituted (e.g., alkyl group having 1 to 6 carbon atoms such as methyl group, ethyl group, or the like, carboxymethyl group, carboxyethyl group, trifluoromethyl group, or the like); aryl group which may be substituted (preferably aryl group having 6 to 10 carbon atoms, e.g., phenyl group, naphthyl group, or the like); aralkyl group which may be substituted (benzyl group or the like, preferably aralkyl group having 7 to 10 carbon atoms in total); allyl group which may be substituted (e.g., vinyl group, 2-propenyl group, or the like); alkoxy group which may be substituted (preferably alkoxy group having 1 to 6 carbon atoms, e.g., methoxy group, ethoxy group, or the like); aryloxy group which may be substituted (e.g., phenoxy group, or the like); acyloxy group which may be substituted (preferably alkanoyloxy group having 2 to 7 carbon atoms such as acetyloxy group, benzoyloxy group, or the like); alkoxycarbonyl group which may be substituted (preferably alkoxycarbonyl group having 2 to 7 carbon atoms, e.g., methoxycarbonyl, ethoxycarbonyl, or the like); aryloxycarbonyl group which may be substituted (e.g., phenoxycarbonyl group, naphthyloxycarbonyl group, or the like); carbamoyl group which may be substituted; acyl group which may be substituted (e.g., acyl group having 2 to 10 carbon atoms such as acetyl group, or the like); carboxyl group; hydroxyl group; cyano group; acylamino group which may be substituted (e.g., alkanoylamino group having 2 to 7 carbon atoms such as acetylamino group, benzoylamino group, or the like); nitro group; halogen atom (e.g., chlorine atom, bromine atom, fluorine atom, or the like); phosphono group; sulfo group; mercapto group; alkylthio group which may be substituted (e.g., alkylthio group having 1 to 6 carbon atoms such as methylthio group or ethylthio group, or the like); alkylsulfoxy group which may be substituted (e.g., alkylsulfoxyl group having 1 to 6 carbon atoms such as methylsulfoxy group or ethylsulfoxy group, or the like); alkylsulfonyl group which may be substituted (e.g., alkylsulfonyl group having 1 to 6 carbon atoms such as methylsulfonyl group or ethylsulfonyl group, or the like); or thiocyanato group.

Preferred optionally substituted imidazole rings are of Formula (7):

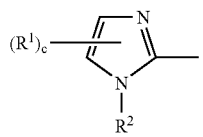

Formula (7)

wherein each $R^1$ may be either the same or different and $R^1$ is selected from: alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, carbamoyl group which may be substituted, hydroxyl group, acyl group which may be substituted, cyano group, acylamino group which may be substituted, nitro group, halogen atom, sulfo group, mercapto group, alkylthio group which may be substituted and thiocyanato group, $R^1$ may further form a condensed ring together with an imidazole ring; c represents an integer of 0 to 2; and $R^2$ represents hydrogen atom, an alkyl group which may be substituted, an aryl group which may be substituted or an allyl group which may be substituted.

In particular, $R^1$ is preferably an alkoxycarbonyl group which may be substituted, carboxyl or cyano.

Preferably $R^2$ is a hydrogen atom or an alkyl group which may be substituted. Most preferably c is 2, both of the two $R^1$'s are cyano or carboxy and $R^2$ is a hydrogen atom or an alkyl group which may be substituted.

Preferred optionally substituted pyrazole rings are of Formula (8):

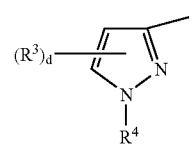

Formula (8)

wherein each $R^3$ may be either the same or different and $R^3$ is selected from: alkyl group which may be substituted, aryl group which may be substituted, aralkyl group which may be substituted, alkoxycarbonyl group which may be substituted, aryloxycarbonyl group which may be substituted, carboxyl group, carbamoyl group which may be substituted, hydroxyl group, cyano group or sulfo group; d represents an integer of 0 to 2; and $R^4$ represents hydrogen atom, alkyl group which may be substituted or aryl group which may be substituted.

Preferred optionally substituted thiazole rings are of Formula (9):

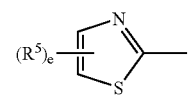

Formula (9)

wherein each $R^5$ may be either the same or different and $R^5$ is selected from: alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, hydroxyl group, acyl group which may be substituted, cyano group, acylamino group which may be substituted, nitro group, halogen atom, sulfo group, alkylthio group which may be substituted or arylthio group which may be substituted, and $R^5$ may further form a condensed ring together with thiazole ring; and e represents an integer of 0 to 2.

Preferably $R^5$ is alkyl group which may be substituted, e=0 and $R^5$ is absent, or $R^5$ forms a condensed ring together with thiazole ring.

Preferred optionally substituted thiadiazole rings are of Formula (10):

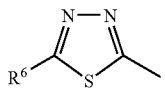

Formula (10)

wherein $R^8$ is selected from: hydrogen atom, alkyl group which may be substituted, aryl group which may be substituted, aralkyl group which may be substituted, mercapto group, alkylthio group which may be substituted, alkylsulfoxy group which may be substituted or alkylsulfonyl group which may be substituted.

$R^6$ is preferably a hydrogen atom or alkyl group which may be substituted.

Preferred optionally substituted triazole rings are of Formula (11):

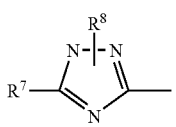

Formula (11)

wherein $R^7$ represents hydrogen atom, alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, carbamoyl group, hydroxyl group, acyl group which may be substituted, cyano group, amino group which may be substituted, acylamino group which may be substituted, nitro group, halogen atom, sulfo group, mercapto group, alkylthio group which may be substituted, alkylsulfoxy group which may be substituted, alkylsulfonyl group which may be substituted or thiocyanato group; $R^8$ represents hydrogen atom, alkyl group which may be substituted, aryl group which may be substituted or allyl group which may be substituted; and $R^7$ and $R^8$ may form a condensed ring together with a triazole ring.

A preferred optionally substituted tetrazole ring is of Formula (12):

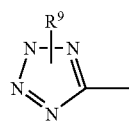

Formula (12)

wherein $R^9$ represents hydrogen atom, alkyl group which may be substituted, aryl group which may be substituted, aralkyl group which may be substituted, alkoxycarbonyl group which may be substituted, aryloxycarbonyl group which may be substituted, carboxyl group, carbamoyl group, hydroxyl group, cyano group or sulfo group.

A preferred optionally substituted oxadiazole ring is of Formula (13):

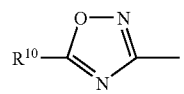

Formula (13)

wherein $R^{10}$ represents hydrogen atom, alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, hydroxyl group, acyl group which may be substituted, cyano group, acylamino group which may be substituted, nitro group, halogen atom, sulfo group, alkylthio group which may be substituted or arylthio group which may be substituted.

Another preferred optionally substituted oxadiazole ring is of Formula (14):

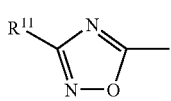

Formula (14)

wherein $R^{11}$ represents hydrogen atom, alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, hydroxyl group, acyl group which may be substituted, cyano group, acylamino group which may be substituted, nitro group, halogen atom, sulfo group, alkylthio group which may be substituted or arylthio group which may be substituted.

A preferred optionally substituted thiadiazole ring is of the Formula (15):

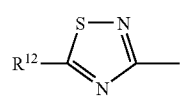

Formula (15)

wherein $R^{12}$ represents hydrogen atom, alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, hydroxyl group, acyl group which may be substituted, cyano group, acylamino group which may be substituted, nitro group, halogen atom, sulfo group, alkylthio group which may be substituted or arylthio group which may be substituted.

In the case where $R^5$ to $R^{12}$ in the general Formulae (7) to (15) have substituents, preferred examples of the substituents include alkyl or alkoxy group having not greater than 10 carbon atoms, preferably not greater than 6 carbon atoms, particularly from not smaller than 1 to not greater than 5 carbon atoms, carboxyl group, and cyano group. Preferred among these substituents are alkyl group, carboxyl group, and cyano group. Particularly preferred among these substituents are carboxyl group and cyano group.

The above mentioned heterocyclic rings exist in a variety of tautomeric forms and all such tautomers are included as part of the present invention.

Particularly preferred optionally substituted triazole rings are of the Formula (16), (17), (18), (19) or (20)

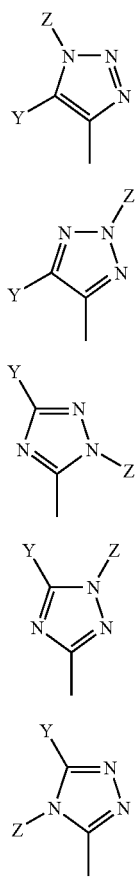

Formula (16)

Formula (17)

Formula (18)

Formula (19)

Formula (20)

wherein:
Z is H, —OH, —Br, —Cl, —F, —CN, —NO$_2$, —PO$_3$H$_2$, —SO$_3$H, —CO$_2$H, optionally substituted phosphoramide, optionally substituted alkyl, optionally substituted alkenyl, optionally substituted alkynyl, optionally substituted aryl, optionally substituted aralkyl, —SR$^{13}$, —SO$_2$R$^{13}$, —SO2NR$^{14}$R$^{15}$, —SOR$^{13}$, —OR$^{13}$, —C(O)R$^{13}$, —C(O)OR$^{13}$, —C(O)NR$^{14}$R$^{15}$, —NR$^{14}$R$^{15}$, —NHCOR$^{13}$; and Y is CF$_3$ or any one of the groups defined for Z; and wherein:
R$^{13}$, R$^{14}$ and R$^{15}$ are each independently H, optionally substituted alkyl, optionally substituted alkenyl, optionally substituted alkynyl, optionally substituted aryl or optionally substituted aralkyl; or R$^{14}$ and R$^{15}$ together with the nitrogen to which they are attached form an optionally substituted 5- or 6-membered ring.

When Y or Z is optionally substituted phosphoramide the phosphoramide is preferably substituted by optionally substituted alkyl, optionally substituted aryl or optionally substituted aralkyl. Preferred substituents include for example methyl, ethyl, n-propyl, iso-propyl, hydroxyethyl, optionally substituted phenyl or optionally substituted benzyl.

When Y or Z is optionally substituted alkyl, the alkyl group is preferably optionally substituted C$_{1-4}$-alkyl, more preferably C$_{1-4}$-alkyl optionally substituted by halo, hydroxy, carboxy, sulfo or cyano. Examples include methyl, ethyl, n-propyl, iso-propyl, trifluoromethyl, hydroxyethyl, cyanoethyl, sulfopropyl and carboxyethyl. However, when Y or Z is optionally substituted alkyl it is especially preferred that the alkyl group is methyl, ethyl or trifluoromethyl.

When Y or Z is optionally substituted alkenyl, Y or Z is preferably optionally substituted C$_2$–C$_4$ alkenyl.

When Y or Z is optionally substituted alkynyl, Y or Z is preferably optionally substituted C$_2$–C$_6$ alkynyl.

When Y or Z is optionally substituted aryl the aryl group is preferably optionally substituted phenyl, optionally substituted naphthyl or optionally substituted heteroaryl. It is especially preferred that when Y is optionally substituted aryl it is optionally substituted phenyl or optionally substituted heteroaryl.

Preferred optional substituents on Y when Y is optionally substituted aryl include sulfo, carboxy, nitro, cyano, halo (preferably chloro), alkoxy (preferably C$_{1-8}$-alkoxy), alkyl ((preferably C$_{1-6}$-alkyl) optionally substituted by halogen (preferably fluoro), hydroxy, carboxy, phosphoric acid and sulfo. Especially preferred optional substituents on Y when Y is optionally substituted aryl are selected from C$_{1-4}$-alkyl, carboxy, phosphoric acid and sulfo. However, it is most preferred that when Y is optionally substituted aryl that the aryl group is substituted by carboxy.

Preferred optional substituents on Z when Z is optionally substituted aryl include sulfo, carboxy, nitro, cyano, halo (preferably chloro), alkoxy (preferably C$_{1-6}$-alkoxy), alkyl (preferably C$_{1-6}$-alkyl) optionally substituted by halogen (preferably fluoro), hydroxy, carboxy, phosphoric acid and sulfo. Especially preferred optional substituents on Z as optionally substituted aryl are selected from carboxy or halogen (preferably chloro).

When Y or Z is optionally substituted aralkyl the aralkyl group is preferably optionally substituted benzyl.

However, Y in Formulae (16), (17), (18), (19) or (20) is preferably H, thiol, carboxy, halo (preferably chloro), alkyl ((preferably C$_{1-6}$-alkyl) optionally substituted by hydroxy, carboxy, halo (preferably fluoro) or sulfo. It is especially preferred that Y in Formulae (16) to (20) is H, C$_{1-4}$-alkyl or carboxy or sulfo. However, it is most especially preferred that Y is H, CO$_2$H or sulfo.

Z in Formulae (16) to (20) is preferably H, ethylester or alkyl (preferably C$_{1-4}$-alkyl) optionally substituted by hydroxy, carboxy, halo (preferably fluoro) or sulfo. It is especially preferred that Z in Formulae (16) to (20) is H or C$_{1-4}$-alkyl. However, it is most especially preferred that Z is H.

In one embodiment Z is H and Y is H, CO$_2$H or sulfo.

R$^{13}$, R$^{14}$ and R$^{15}$ are each independently preferably H, optionally substituted C$_{1-4}$-alkyl or optionally substituted aryl, more preferably H, C$_{1-4}$-alkyl optionally substituted by hydroxy, carboxy, sulfo or cyano or phenyl optionally substituted by hydroxy, carboxy, sulfo, nitro, trifluoromethyl or cyano. Examples of groups represented by R$^{13}$, R$^{14}$ and R$^{15}$ include methyl, ethyl, n-propyl, iso-propyl, hydroxyethyl, cyanoethyl, sulfopropyl, carboxyethyl or carboxyphenyl. It is especially preferred however that R$^{13}$, R$^{14}$ and R$^{15}$ are H, optionally substituted C$_{1-4}$-alkyl for example, trifluoromethyl, hydroxyethyl or cyanoethyl, or optionally substituted aryl for example phenyl optionally substituted by carboxy; or $R^{14}$ and $R^{15}$ together with the nitrogen to which they are attached form a 5- or 6- membered ring (preferably morpholine, piperidine or piperazine).

A preferred optionally substituted pyridine ring is of Formula (21):

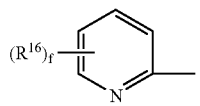

Formula (21)

wherein each $R^{16}$ may be either the same or different and $R^{16}$ is as described and preferred for Y in Formula (16) to (20) above; f represents an integer of 0 to 4.

Preferably f is 0.

A preferred optionally substituted pyrimidine ring is of Formula (22):

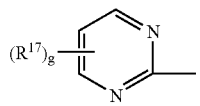

Formula (22)

wherein each $R^{17}$ may be either the same or different and $R^{17}$ is as described and preferred for Y in Formula (16) to (20) above; g represents an integer of 0 to 3.

A preferred optionally substituted pyrazine ring is of Formula (23):

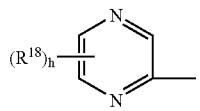

Formula (23)

wherein each $R^{18}$ may be either the same or different and $R^{18}$ is as described and preferred for Y in Formula (16) to (20) above; h represents an integer of 0 to 3.

It is particularly preferred that the 5- to 7- membered heterocyclic ring is an optionally substituted pyridine, especially a moiety of Formula (21), or a 1,2,4-triazole especially a moiety of Formulae (18) to (20).

The transition metal salt preferably comprises one or more of the following metals: nickel, chromium, cobalt, copper, zinc, iron or manganese.

It is particularly preferred that the transition metal salt comprises nickel or copper, especially nickel.

The compound of Formula (1) is preferably chelated to the transition metal in the ratio 1:1, 2:1, 2:2 or 2:3 respectively, especially in the ratio 1:1 or 2:1 respectively.

When there is more than one ligand of Formula (1) present in the metal chelate compound then the ligands of Formula (1) may be the same or different but preferably they are the same.

The metal chelate compound obtainable from a compound of Formula (1) may also comprise 1 or more additional ligands. These ligands may be coloured or colourless and when there is more than 1 they may be the same or different.

Compounds of Formula (1) and the metal chelate compounds obtainable from a compound of Formula (1), as described herein, may exist in tautomeric forms other than those shown in this specification. These tautomers are also included within the scope of the present inventions.

The metal chelate compounds obtainable from compounds of Formula (1) may also exist in different geometries e.g. octahedral or square planar. These different geometric forms are also included in the scope of the present invention.

It is especially preferred that the metal chelate compounds obtainable from compounds of Formula (1) are magenta in colour. Preferably the metal chelate compounds obtainable from compounds of Formula (1) have a chroma of at least 50 when printed on plain paper. Preferably the metal chelate compounds obtainable from compounds of Formula (1) are water-soluble, more preferably they have a solubility in water at 20° C. of 0.5 to 15, more preferably 0.6 to 10% by weight.

The metal chelate compounds obtainable from compounds of Formula (1) of the first aspect of the present invention provide prints which exhibit a high light-fastness, ozone fastness, wet fastness and good optical density.

Compounds of Formula (1) are preferably free from fibre reactive groups. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye. As examples of fibre reactive groups preferably not present in the compounds of the first aspect of the present invention there may be mentioned aliphatic sulfonyl groups which contain a sulphate ester group in the beta-position to the sulphur atom, e.g. beta-sulphatoethylsulfonyl groups, alpha, beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulfonyl- or beta-chloroethylsulfonyl- or beta-sulphatoethyl-sulfonyl-endo-methylene cyclohexane carboxylic acids. Other examples of cellulose reactive groups are tetrafluorocyclobutyl carbonyl, trifluoro-cyclobutenyl carbonyl, tetrafluorocyclobutylethenyl carbonyl, trifluoro-cyclobutenylethenyl carbonyl; activated halogenated 1,3-dicyanobenzene radicals; and heterocyclic radicals which contain 1, 2 or 3 nitrogen atoms in the heterocyclic ring and at least one cellulose reactive substituent on a carbon atom of the ring.

The compounds of Formula (1) and the metal chelate compound obtainable from compounds of Formula (1) may be in the free acid or salt form. Preferred salts are water-soluble, for example alkali metal salts, especially lithium, sodium, potassium, ammonium, substituted ammonium and mixed salts thereof. Preferred alkali metal salts are those with sodium or lithium ammonium and substituted alkyl ammonium salts.

Preferred ammonium and substituted ammonium salts have cations of the formula $^+NV_4$ wherein each V independently is H or optionally substituted alkyl, or two groups represented by V are H or optionally substituted alkyl and the remaining two groups represented by V, together with the N atom to which they are attached, form a 5- or 6- membered ring (preferably a morpholinyl, pyridinyl or piperidinyl ring).

Preferably each V independently is H or $C_{1-4}$-alkyl, more preferably H, $CH_3$ or $CH_3CH_2$, especially H.

Examples of cations include $^+NH_4$, morpholinium, piperidinium, pyridinium, $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $(CH_3)_2CHN^+H_3$, $N^+(CH_3)_4$, $N^+(CH_2CH_3)_4$, N-methyl pyridinium, N,N-dimethyl piperidinium and N,N-dimethyl morpholinium.

Sodium, lithium, potassium, ammonium, or substituted ammonium salts are preferred because we have found that these salts provide prints which exhibit a high light-fastness when incorporated into an ink-jet printing ink.

The metal chelate compounds may be prepared using techniques that are well known in the art. For example a suitable method comprises mixing a solution of a transition metal salt and a solution of a compound of Formula (1), preferably in aqueous solution.

Normally 0.5 to 24 hours is sufficient for the transition metal salt to form a metal chelate compound with the compound of Formula (1).

The compounds of Formula (1) may be prepared by, for example, diazotising a compound of the formula $Ar-NH_2$ to give a diazonium salt and coupling the resultant diazonium salt with the desired hydroxylated coupler. A protection/deprotection sequence employing, preferably, the N-oxide derivatives may be required. Methods for introducing and removing the protecting group(s) are well known in the art.

The diazotisation is preferably performed at a temperature below 6° C., more preferably at a temperature in the range −10° C. to 5° C. Preferably the diazotisation is performed in water, preferably at a pH below 7. Dilute mineral acid, e.g. HCl or $H_2SO_4$, are often used to achieve the desired acidic conditions.

An alternative preparation of such compounds involves the condensation of a hydrazine derivative with a diketone, to give rise to a hydrazone. If desired, sulfonation of the hydrazone can be achieved under standard conditions using fuming sulphuric acid.

The product of the above process may be converted to a salt by conventional techniques as hereinbefore described. Alternatively the product may be isolated in its free acid form by acidifying the reaction mixture, preferably using a mineral acid, for example hydrochloric acid and when the product precipitates as a solid it may be separated from the mixture by filtration. Unwanted anions may be and preferably are removed from the product of the process by dialysis, osmosis, ultrafiltration or a combination thereof. Alternatively, the product solution is subjected to the above purification directly without isolation of the product.

The present invention also covers mixtures comprising two or more different metal chelate compounds of the present invention or salts thereof. Furthermore, the compounds of the first aspect of the present invention may be mixed with other dyes, especially those listed in the International Colour Index, to adjust the shade or other properties as desired.

According to a second aspect of the present invention there is provided a composition comprising (a) one or more metal chelate compound(s) according to the first aspect of the present invention; and (b) a liquid medium.

The liquid medium preferably comprises:
(i) water;
(ii) a mixture of water and an organic solvent; or
(iii) an organic solvent free from water.

The number of parts by weight of component (a) of the ink is preferably from 0.01 to 30, more preferably 0.1 to 20, especially from 0.5 to 15, and more especially from 1 to 5 parts. The number of parts by weight of component (b) is preferably from 99.99 to 70, more preferably from 99.9 to 80, especially from 99.5 to 85, and more especially from 99 to 95 parts. The number of parts (a)+(b) and all parts mentioned herein are 100 by weight.

Preferably component (a) is completely dissolved in component (b). Preferably component (a) has a solubility in component (b) at 20° C. of at least 10%. This allows the preparation of concentrates which may be used to prepare more dilute inks and reduces the chance of the compound(s) of component (a) of the ink precipitating if evaporation of the liquid medium occurs during storage.

When the liquid medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide and sulfolane. Preferably the liquid medium comprises water and 2 or more, especially from 2 to 8, water-miscible organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable ink media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises an organic solvent free from water, (i.e. less than 1% water by weight) the solvent preferably has a boiling point of from 30° to 200° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) and/or an alcohol (especially a $C_{1-4}$-alkanol, such as ethanol or propanol).

The organic solvent free from water may be a single organic solvent or a mixture of two or more organic solvents. It is preferred that when the medium is an organic solvent free from water it is a mixture of 2 to 5 different organic solvents: This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

An especially preferred ink comprises:
(a) from 1 to 10 parts in total of a metal chelate compound of Formula (1) as hereinbefore defined;
(b) from 2 to 60, more preferably 5 to 40 parts of water-miscible organic solvent; and
(c) from 30 to 97, more preferably 40 to 85 parts of water;

wherein all parts are by weight.

Preferably the sum of the parts (a)+(b)+(c)=100.

When the liquid medium in the ink comprises a mixture of water and an organic solvent; or an organic solvent free from water, component (a) of the ink may comprise a compound as hereinbefore defined in relation to the first aspect of the invention.

Preferred low melting solid media have a melting point in the range from 60° C. to 125° C. Suitable low melting point solids include long chain fatty acids or alcohols, preferably those with $C_{18-24}$ chains, and sulfonamides. The compound of the first aspect of the present invention may be dissolved in the low melting point solid or may be finely dispersed in it.

Preferably the composition according to the second aspect of the invention is an ink suitable for use in an ink-jet printer.

The inks according to the present invention may also contain additional components conventionally used in ink-jet printing inks, for example viscosity and surface tension modifiers, corrosion inhibitors, biocides, kogation reducing additives, anti-cockle agents to reduce paper curling and surfactants which may be ionic or non-ionic.

The pH of the ink is preferably from 4 to 11, more preferably from 7 to 10.

The viscosity of the ink at 25° C. is preferably less than 50 cP, more preferably less than 20 cP and especially less than 5 cP.

When the inks according to the invention are used as ink-jet printing inks, the ink preferably has a concentration of less than 500 parts per million, more preferably less than 100 parts per million of halide ions.

It is also preferred that the ink has less than 100, more preferably less than 50 parts per million of divalent and trivalent metals (other than any divalent and trivalent metal ions bound to a compound of Formula (1) or any other component of the ink), wherein parts refer to parts by weight relative to the total weight of the ink.

Preferably an ink suitable for use in an ink-jet printer has been filtered through a filter having a mean pore size below 10 µm, more preferably below 3 µm, especially below 2 µm, more especially below 1 µm. This filtration removes particulate matter that could otherwise block the fine nozzles found in many ink-jet printers.

A third aspect of the present invention provides a process for printing an image on a substrate comprising applying thereto by means of an ink-jet printer an ink according to the second aspect of the invention.

The ink used in this process is preferably as defined in the second aspect of the present invention.

The ink-jet printer preferably applies the ink to the substrate in the form of droplets which are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink-jet printers the oscillation of a small crystal causes ejection of the ink from the orifice. Alternately the ink can be ejected by an electromechanical actuator connected to a moveable paddle or plunger, for example as described in International Patent Application WO 00/48938 and International Patent Application WO 00/55089.

The substrate is preferably paper, plastic, a textile, metal or glass, more preferably paper, an overhead projector slide or a textile material, especially paper. Preferred papers are plain or treated papers which may have an acid, alkaline or neutral character. Glossy papers are especially preferred. More especially photographic quality paper is preferred Examples of commercially available papers include, HP Premium Coated Paper, HP Photopaper (all available from Hewlett Packard Inc.), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper (available from Xerox).

A fourth aspect of the present invention provides a substrate, preferably a paper, an overhead projector slide or a textile material, printed with a metal chelate compound according to the first aspect of the invention, printed with an ink according to the second aspect of the invention or printed by means of a process according to the third aspect of the present invention.

According to a fifth aspect of the present invention there is provided an ink-jet printer cartridge comprising a chamber and ink, wherein the ink is present in the chamber and the ink is as described in the second aspect of the present invention.

According to a sixth aspect of the present invention there is provided an ink-jet printer containing an ink-jet printer cartridge, wherein the ink-jet printer cartridge is as defined in the sixth aspect of the present invention.

The invention is further illustrated by the following Examples in which all parts and percentages are by weight unless otherwise stated.

EXAMPLE 1

Preparation of a Nickel Chelate of a Compound of Formula:

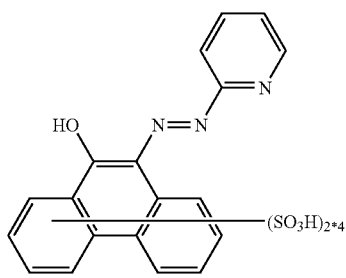

Stage 1 (a)

Phenanthrenequinone (2.08 g, 0.01 mol) and 2-hydrazinopyridine (1.09 g, 0.01 mol) were added to stirred glacial acetic acid (25 ml). The mixture was heated to 100° C. for two hours and then allowed to cool to room temperature and filtered. The filtrate was evaporated under reduced pressure to leave a tarry material. This residue was ground under water, allowing the resultant solid to be collected by filtration. The product was washed with water and then dried in an oven at 50° C. to give an orange/red solid.

Stage 1(b)

The azophenanthrene prepared in stage 1(a) (2.99 g, 0.01 mol) was added to an ice-cold stirred solution of 10% fuming sulphuric acid (35 ml). The reaction mixture was heated to 100° C. and stirred for a further 2 hours. The reaction mixture was poured carefully onto ice before increasing the pH to pH8 using concentrated sodium hydroxide, maintaining the temperature with an ice/water bath. The mixture was dialysed to low conductivity, filtered and the sulfonated ligand isolated by evaporating under reduced pressure. The product was shown to be a mixture of di- and tri-sulfonated material, by reverse phase HPLC using a octadecasilyl column and a gradient elution from 0.01 M ammonium acetate solution to a final solution of 90% acetonitrile:10% ammonium acetate. The majority of the product is believed to be the title product though some product in which the pyridine ring was sulfonated may also be present. The relative amounts of the di- and tri-sulfonated species was estimated from the peaks corresponding to each species.

Stage 1(c)

A solution of nickel acetate tetrahydrate (1.25 g, 0.005 mol) in water (15 ml) was added dropwise to the product from stage (b) (4.59 g, 0.01 mol) dissolved in water (250 ml) at pH7. The reaction mixture was stirred at room temperature and the pH of the solution raised to pH8 with 2MNaOH before being dialysed to low conductivity. The title compound was obtained by filtering the solution and then evaporating the filtrate under reduced pressure.

EXAMPLE 2

Preparation of a Nickel Chelate of a Compound of Formula:

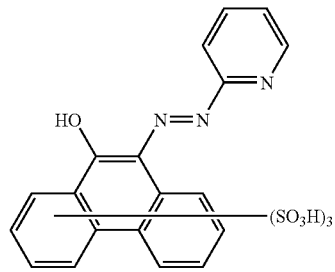

The nickel chelate of this compound was prepared using an analogous process to that in Example 1 except that in stage (b) 20% fuming sulphuric acid was used in place of 10% fuming sulphuric acid. As in Example 1 the product as produced may also contain some material where the pyridine ring is sulfonated.

EXAMPLES 3 to 7

The compounds described in Table 1 were prepared using an analogous process to that described in Example 1 except that in stage 1(a) an alternative hydrazine was used in place of 2-hydrazinopyridine and instead of the screened reaction mixture being isolated by evaporated under reduced pressure as in stage 1(b), the product formed as a precipitate which was collected by filtration. The product was then washed with glacial acetic acid and dried in a vacuum oven at 50° C. to give an orange/red solid.

TABLE 1

| Example | Alternative Hydrazine | Nickel chelate of compound |
|---|---|---|
| 3 | 6-hydrazinyl-nicotinic acid (HO$_2$C-pyridine-NHNH$_2$) | azo dye with pyridine-CO$_2$H group linked via N=N to hydroxy-naphthalene-(SO$_3$H)$_2$ |
| 4 | 2-hydrazinylpyrazine | azo dye with pyrazine linked via N=N to hydroxy-naphthalene-(SO$_3$H)$_2$ |
| 5 | 2-hydrazinylpyrimidine | azo dye with pyrimidine linked via N=N to hydroxy-naphthalene-(SO$_3$H)$_2$ |
| 6 | 2-hydrazinyl-6-methyl-4-hydroxypyrimidine (H$_3$C, HO, NHNH$_2$) | azo dye with 6-methyl-4-hydroxypyrimidine linked via N=N to hydroxy-naphthalene-(SO$_3$H)$_2$ |
| 7 | 2-hydrazinyl-5-nitropyridine (O$_2$N-pyridine-NHNH$_2$) | azo dye with 5-nitropyridine linked via N=N to hydroxy-naphthalene-(SO$_3$H)$_2$ |

EXAMPLES 8-11

The compounds described in Table 2 were prepared using an analogous process to that described in Example 1 except that in stage 1(a) an alternative diketone was used in place of phenanthrenedione and the reaction was performed in denatured ethanol (100 ml) and concentrated hydrochloric acid (0.5 ml).

EXAMPLES 12

Preparation of the Copper Chelate of the Compound Prepared in Example 1

This was made as described in Example 1 except that a solution of copper (II) acetate hydrate was used in place of nickel acetate tetrahydrate.

TABLE 2

| Example | Alternative Diketone | Nickel chelate of compound |
|---|---|---|
| 8 | (diketone: 4,4'-dimethoxybenzil — two 4-MeO-phenyl groups linked by two C=O) | (pyridin-2-yl-azo enol with two 3-MeO-4-SO₃H-phenyl substituents) |
| 9 | (diketone: difuran-2-yl ethanedione — two furan-2-yl groups linked by two C=O) | (pyridin-2-yl-azo enol with two sulfonated furan substituents) |
| 10 | (diketone: dithiophen-2-yl ethanedione — two thiophen-2-yl groups linked by two C=O) | (pyridin-2-yl-azo enol with two sulfonated thiophene substituents) |
| 11 | (diketone: acenaphthenequinone) | (pyridin-2-yl-azo acenaphthylenol with (SO₃H)₂ substitution) |

EXAMPLE 13

Preparation of the Copper Chelate of the Compound Prepared in Example 8

This was made as described in Example 8 except that a solution of copper (II) acetate hydrate was used in place of nickel acetate tetrahydrate.

EXAMPLE 14

Preparation of the Copper Chelate of the Compound Prepared in Example 9

This was made as described in Example 9 except that a solution of copper (II) acetate hydrate was used in place of nickel acetate tetrahydrate.

EXAMPLE 15

Preparation of the Copper Chelate of the Compound Prepared in Example 10

This was made as described in Example 10 except that a solution of copper (II) acetate hydrate was used in place of nickel acetate tetrahydrate.

EXAMPLE 16

Preparation of the Copper Chelate of the Compound Prepared in Example 11

This was made as described in Example I except that a solution of copper (II) acetate hydrate was used in place of nickel acetate tetrahydrate.

EXAMPLE 17

Preparation of a Nickel Chelate of a Compound of formula:

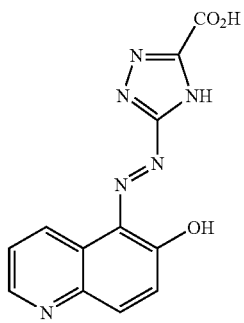

Stage 17(a):

3-Amino-1,2,4-triazole-5-carboxylic acid hydrate (1.28 g, 0.01 mol) was dissolved in water (50 ml). Sodium nitrite (0.76 g, 0.011 mol) was added and the solution was stirred until the sodium nitrite had dissolved. The mixture was then added dropwise to a cooled mix of ice-water (30 g) and concentrated hydrochloric acid (3.0 ml) at 0-5° C. The mixture was stirred for 30 minutes at 0-5° C. and then excess nitrous acid was destroyed by the addition of sulfamic acid. The resultant diazonium salt suspension was added slowly to a solution of 6-hydroxyquinoline (1.45 g, 0.01 mol) in water (100 ml) at pH 8-9 (adjusted with 2M NaOH) and cooled to below 5° C. The reaction mixture was then stirred at 0-5° C. for one hour and the product was precipitated by acidification to pH 4 with 2M HCl and collected by filtration. The product was washed with water and then dried in a vacuum desiccator to give an orange solid.

Stage 17(b):

A solution of nickel acetate tetrahydrate (1.43 g, 0.0057 mol) in water (10 ml) was added dropwise to the product from stage 17(a) (2.5 g, 0.0076 mol) dissolved in water (100 ml) at pH 7. The reaction mixture was stirred for 2 hours at room temperature and then dialysed to low conductivity. The title compound is obtained by evaporation under reduced pressure to afford a dark crystalline solid.

EXAMPLES 18 TO 20

The compounds described in Table 3 may be prepared using an analogous process to that described in Example 17 except that in stage 17(a) the coupler shown in Table 4 is used in place of 6-hydroxyquinoline and an additional step is employed to increase aqueous solubility.

Additional Step

The non-metallised dye prepared in step (a) (0.01 mol) is added to an ice cold stirred solution of 20% fuming sulphuric acid (10 ml). The reaction mixture is allowed to rise to room temperature and stirred for a further 1 hour. The reaction mixture is poured carefully onto ice and the resultant solid collected by filtration. The metallisation step is carried out as in Example 12 stage (b).

TABLE 3

| Example | Coupler | Compound Name |
| --- | --- | --- |
| 18 | HO—[anthracene]—SO$_3$H | Nickel chelate of [2-hydroxysulfonated-anthracen-1-ylazo]-2H-[1,2,4]triazole-3-carboxylic acid]. (The coupler is made following the route described in Liebigs Annalen 212, 1882, 63) |

TABLE 3-continued

| Example | Coupler | Compound Name |
|---|---|---|
| 19 | HO—[structure with SO₃H] | Nickel chelate of [3-hydroxy sulfonated phenanthren-4-ylazo)-2H-[1,2,4]triazole-3-carboxylic acid]. |
| 20 | HO—[structure with SO₃H] | Nickel chelate of [2-hydroxy sulfonated phenanthren-1-ylazo)-2H-[1,2,4]triazole-3-carboxylic acid]. |

Comparative Dye 1

Comparative Dye 1 was prepared as described in Example 4 of EP1270676A and is of Formula:

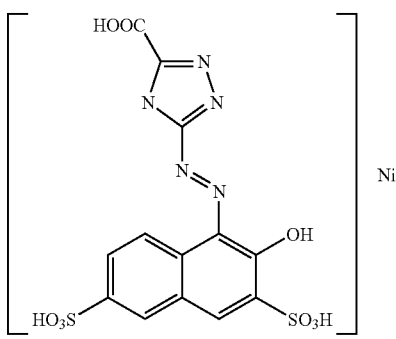

Comparative Dye 2

Comparative Dye 2 was prepared as described for Example IV of EP0902064B and is of Formula:

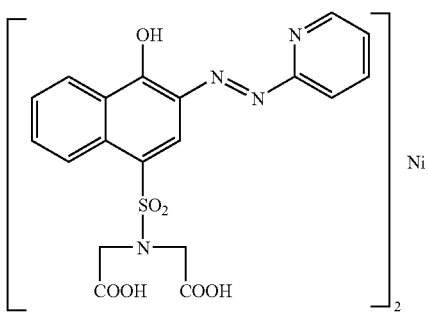

EXAMPLE 21

Inks and Ink-Jet Printing

The dyes described in Examples 1, 2 and 3 and Comparative Dyes 1 and 2 were each converted into the corresponding inks by dissolving 3.5 parts of each in 96.5 parts of a liquid medium comprising:

5 parts 2-pyrrolidone;

5 parts thiodiglycol;

2 parts Surfynol™ 465 (a non-ionic surfactant available from Air Products Inc.);

88 parts water: and adjusted to pH 9.5 with ammonium hydroxide.

The inks so prepared were designated as Ink 1, Ink 2, Ink 3, Comparative Ink 1 and Comparative Ink 2 depending on which dye was incorporated therein Ink-Jet Printing Inks 1, 2 and 3 and the Comparative Inks 1 and 2 were filtered through a 0.45 micron nylon filters and then incorporated into empty ink-jet print cartridges using a syringe.

The inks were then printed using an HP560C printer onto both Hewlett-Packard Premium Plus Photo Paper and Canon Professional Photo Paper PR101 at 100% and 70% strength.

These prints were tested for ozone fastness by exposure to 1 ppm ozone at 40° C., 50% relative humidity for 24 hrs in a Hampden 903 Ozone cabinet. The prints were also tested for light fastness by exposure to a Xenon Arc lamp for 100 hours in an Atlas CI5000 Weatherometer. Fastness of the printed ink to ozone and light was judged by the difference in the reflected optical density (ROD) before and after exposure.

Colour measurements of the prints before and after exposure to ozone and light were performed using a Gretag spectrolino spectrophotometer set to the following parameters:

| | |
|---|---|
| Measuring Geometry | 0°/45° |
| Spectral Range | 400–700 nm |
| Spectral Interval | 20 nm |
| Illuminant | D65 |
| Observer | 2° (UE1931) |
| Density | ANSI A |
| External Filler | None |

Ozone and light fastness were assessed by the change in the shade of the print as judged via percentage ROD loss of the print, where a lower figure indicates higher fastness. The figures in brackets correspond to the prints at 70% strength.

TABLE 4

| | % ROD loss Lightfastness | | % ROD loss Ozonefastness | |
|---|---|---|---|---|
| | Canon PR101 | HP Premium Plus | Canon PR101 | HP Premium Plus |
| Ink 1 | 29 (38) | 21 (9) | 9 (19) | Not tested |
| Ink 2 | 27 (38) | 21 (13) | 4 (12) | Not tested |
| Ink 3 | 25 (38) | 22 (14) | 1 (16) | Not tested |
| Comparative Ink 1 | 34 (39) | 24 (17) | 57 (61) | Not tested |
| Comparative Ink 2 | 37 (45) | 33 (21) | 35 (34) | Not tested |

Table 4 shows that inkjet prints prepared from compounds and inks of the present invention have improved light fastness and greatly improved ozone fastness when compared to prints obtained from the comparative dyes and inks.

Further Inks

The inks described in Tables A and B may be prepared wherein the Compound described in the first column is the Compound made in the above example of the same number. Numbers quoted in the second column onwards refer to the number of parts of the relevant ingredient and all parts are by weight. The inks may be applied to paper by thermal or piezo ink-jet printing.

The following abbreviations are used in Tables A and B:

PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE A

| Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 5.1 | 96 | | | | | | | | 4 | | |
| 13 | 10.8 | 90 | 5 | | | | | | 5 | | | |
| 14 | 10.0 | 80 | 2 | 6 | 2 | 5 | | | 1 | | 4 | |
| 15 | 1.8 | 80 | | 5 | | | | | | | 15 | |
| 16 | 2.6 | 84 | | | 11 | | | | | | 5 | |
| 17 | 3.3 | 80 | 2 | | | 10 | | | | 2 | | 6 |
| 18 | 12.0 | 90 | | | | 7 | 0.3 | | 3 | | | |
| 19 | 5.4 | 69 | 2 | 20 | 2 | 1 | | | | | 3 | 3 |
| 1 | 6.0 | 91 | | | 4 | | | | | | 5 | |

TABLE B

| Example | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 2 | 9.0 | 90 | | 5 | | | | | | 1.2 | | 5 |
| 3 | 1.5 | 85 | 5 | 5 | | 0.15 | 5.0 | 0.2 | | | | |
| 4 | 2.5 | 90 | | 6 | 4 | | | | | 0.12 | | |
| 5 | 3.1 | 82 | 4 | 8 | | 0.3 | | | | | | 6 |
| 6 | 0.9 | 85 | | 10 | | | | | 5 | 0.2 | | |
| 7 | 8.0 | 90 | | 5 | 5 | | | 0.3 | | | | |
| 8 | 4.0 | 70 | | 10 | 4 | | | | 1 | | 4 | 11 |
| 9 | 2.2 | 75 | 4 | 10 | 3 | | | | 2 | | 6 | |
| 10 | 10.0 | 91 | | | 6 | | | | | | | 3 |
| 11 | 9.0 | 76 | | 9 | 7 | | 3.0 | | | 0.95 | 5 | |
| 12 | 5.0 | 78 | 5 | 11 | | | | | | | 6 | |
| 13 | 5.4 | 86 | | | 7 | | | | | | 7 | |
| 14 | 2.1 | 70 | 5 | 5 | 5 | 0.1 | 0.2 | 0.1 | 5 | 0.1 | 5 | |
| 15 | 2.0 | 90 | | 10 | | | | | | | | |

TABLE B-continued

| Example | Dye Content | Water | PG | DEG | NMP | CET | TBT | TDG | BDL | PHO | 2P | PI2 |
|---|---|---|---|---|---|---|---|---|---|---|---|---|
| 16 | 2 | 88 | | | | | | 10 | | | | |
| 17 | 5 | 78 | | | 5 | | | 12 | | | 5 | |
| 18 | 8 | 70 | 2 | | 8 | | | 15 | | | 5 | |
| 19 | 10 | 80 | | | | | | 8 | | | 12 | |
| 1 | 10 | 80 | | 10 | | | | | | | | |

The invention claimed is:

1. A metal chelate compound obtainable from contacting a transition metal salt with a compound of the Formula (1):

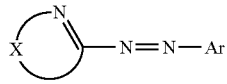

Formula (1)

wherein:

x represents plural atoms required to form at least one optionally substituted 5- to 7-membered heterocyclic ring; and Ar is an optionally substituted stilbene, acenaphthylene, phenanthrene or anthracene group carrying a hydroxy, amino or carboxy group adjacent to the —N=N— group shown in Formula (1) or 6-hydroxyquinoline where the hydroxy group is adjacent to the —N=N— group shown in Formula (1);

provided that when the compound of Formula (1) is of Formula:

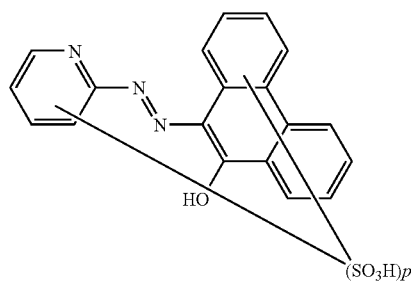

that, p, the level of sulfonation, is not in the range 1 to 2.

2. A metal chelate compound according to claim 1 wherein Ar is an optionally substituted stilbene group of the Formula (2a) or Formula (2b):

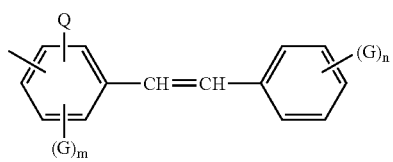

Formula (2a)

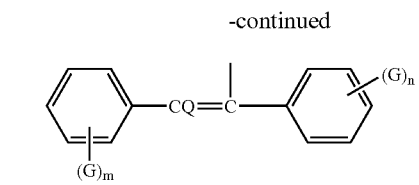

Formula (2b)

wherein

Q is a hydroxy, amino or carboxy group positioned adjacent to the —N=N— group shown in Formula (1);

G is a water-solubilising group; and m and n are each independently 0 to 2.

3. A metal chelate compound according to claim 1 wherein Ar is an optionally substituted 6 hydroxyquinoline group of Formula (3):

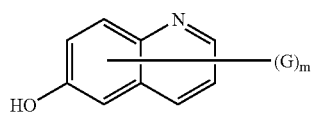

Formula (3)

wherein:

the hydroxy group is positioned adjacent to the —N=N— group shown in Formula (1);

G is a water-solubilising group; and m is 0 to 2.

4. A metal chelate compound according to claim 1 wherein Ar is an optionally substituted phenanthrene group of Formula (4a):

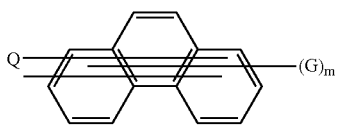

Formula (4a)

wherein

Q is a hydroxy, amino or carboxy group positioned adjacent to the —N=N— group shown in Formula (1);

G is a water-solubilising group; and m is 2 to 3.

5. A metal chelate compound according to claim 1 wherein Ar is an optionally substituted anthracene group of Formula (5)

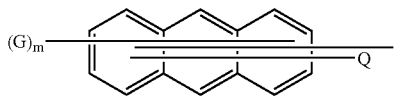

Formula (5)

wherein
Q is a hydroxy, amino or carboxy group positioned adjacent to the —N=N— group shown in Formula (1);
G is a water-solubilising group; and
m is 1 to 4.

6. A metal chelate compound according to claim 1 wherein Ar is an optionally substituted acenaphthylene group is of Formula (6):

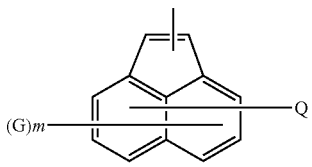

Formula (6)

wherein
Q is a hydroxy, amino or carboxy group positioned adjacent to the —N=N— group shown in Formula (1);
G is a water-solubilising group; and
m is 1 to 2.

7. A metal chelate compound according to claim 2 wherein G is sulfo.

8. A metal chelate compound according to claim 1 wherein the heterocyclic ring containing X is an optionally substituted pyridine or optionally substituted triazole ring.

9. A metal chelate compound according to claim 1 wherein the transition metal salt transition metal salt comprises nickel or copper.

10. A metal chelate compound according to claim 1 wherein the transition metal salt transition metal salt comprises nickel.

11. A composition comprising (a) one or more metal chelate compound(s) according claim 1; and (b) a liquid medium.

12. A composition according to claim 11 which is an ink suitable for use in an ink-jet printer.

13. An ink according to either claim 11 or claim 12 which comprises:
(a) from 1 to 10 parts in total of a metal chelate compound as described in any one of claims 1 to 10;
(b) from 2 to 60 parts of water-miscible organic solvent; and
(c) from 30 to 97 parts of water;
wherein all parts are by weight.

14. A process for printing an image on a substrate comprising applying thereto by means of an ink-jet printer an ink as described in claim 1.

15. A substrate printed with a metal chelate compound according to claim 1.

16. An ink-jet printer cartridge comprising a chamber and ink, wherein the ink is present in the chamber and the ink is as described in either claim 12 or claim 13.

17. A substrate printed with a composition according to claim 11.

18. A substrate printed by a process according to claim 14.

* * * * *